Dec. 21, 1965 L. PÉRAS ETAL 3,224,028
WINDSHIELD WIPERS
Original Filed May 25, 1959
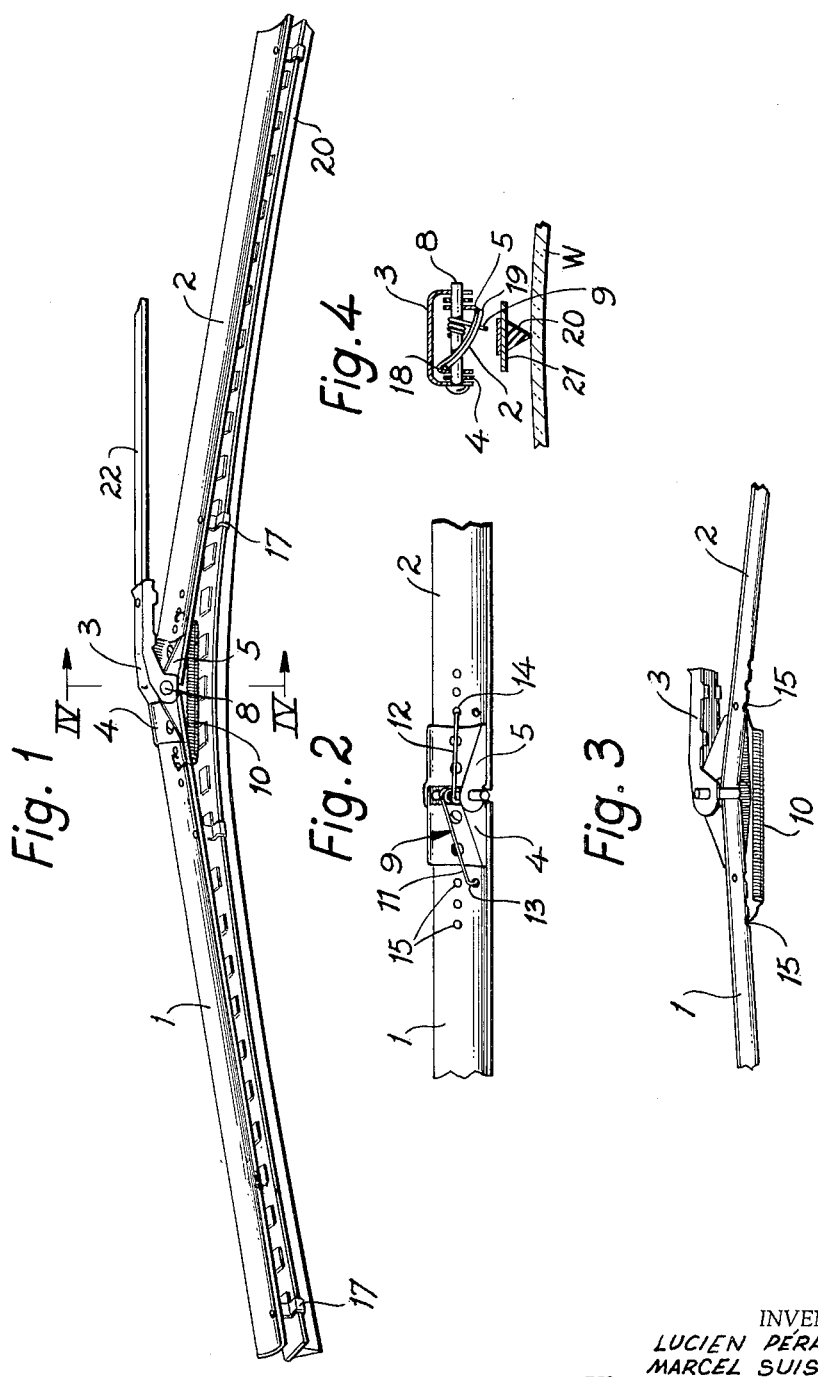
INVENTORS
LUCIEN PÉRAS
MARCEL SUISSE
BY
*Robert E. Burns*
ATTORNEY

United States Patent Office 3,224,028
Patented Dec. 21, 1965

3,224,028
WINDSHIELD WIPERS
Lucien Péras, Billancourt, and Marcel Suisse, Paris, France, assignors to The Anderson Company, Gary, Ind., a corporation of Indiana
Continuation of application Ser. No. 815,654, May 25, 1959. This application Dec. 24, 1963, Ser. No. 334,081
Claims priority, application France May 31, 1958
The portion of the term of the patent subsequent to June 5, 1979, has been disclaimed
9 Claims. (Cl. 15—250.42)

The invention relates generally to windshield wipers for windshields of vehicles and more particularly to improved arms for supporting a wiper blade used with curved windshields.

This application is a continuation of our copending application, Serial No. 815,654 filed May 25, 1959, now forfeited.

In U.S. patent application serial No. 675,229 of July 30, 1957 now Patent No. 3,037,233 issued June 6, 1962, there are described improvements in windshield wipers of vehicles, in which the arm of the wiper is shaped so that the tangential wind produced by the air flowing along a flat windshield surface tends to press the wiper against the windshield by forming this arm of a straight rigid strip of material having an air foil cross-section with oppositely disposed convex and concave surfaces, the arm being mounted with the concave surface facing outwardly from the windshield.

Now it is the object of the present invention to provide improved windshield wiper arms for a curved windshield of a vehicle that are shaped and positioned with respect to the windshield for the windstream caused by the motion of the vehicle to press the arms toward the windshield rather than away from it.

According to a first improvement the mounting consists of two arms, each having an arcuate cross-section. The arms are mounted with like surfaces in alignment and pivotally interconnected at their adjacent ends by the strap of the wiper carrier or supporting arm. A resilient member or spring having oppositely disposed ends is connected by said respective ends to the convex surfaces of the adjacent ends of the wiper arms to bias them together about their common pivot.

Another improvement characterizing the present invention consists in permitting an easy adjustment of the pressure exerted by the resilient member or spring:

(a) In the case of windshields having a substantially constant curvature, a torsion spring may advantageously be provided and such that the torsion can be altered as a function of the curvature of the glass panel engaged by the wiper insert so as to properly distribute the pressure to the different fixation points of the blade and mounting;

(b) In the case of variable-curvature glass panels such as panoramic windshields wherein the wiper blade sweeps a sector of which one side has either a perfectly straight generatrix or a very slight curvature and the other side has a maximum curvature, the connecting spring is a traction spring disposed longitudinally to the blade insert on the side opposite to the supporting arm; this spring ensures a practically constant pressure distribution throughout the travel of the wiper, and this pressure can be adjusted by anchoring the spring ends at different locations along the two arms of the mounting; besides, this pressure distribution may be rendered purposely unequal in the two arms by anchoring the spring asymmetrically.

The essential advantages characterizing a windshield wiper according to this invention may be summarized as follows:

(1) The wiper structure has an aerodynamic contour particularly pure throughout its length, and the aerodynamic compensation efficiency is maximum with a minimum braking effect.

(2) The manufacture is simplified and the cost reduced accordingly.

(3) The appearance of the wiper in the inoperative position is improved and its vertical dimension is reduced, thereby facilitating the concealed housing of the device.

(4) The operating pressure of the windshield wiper is adequately distributed as consistent with the windshield curvature.

(5) This pressure can be adjusted in order to adapt to each specific case (instead of a single standard model providing a single, predetermined pressure and intended for use on variable-curvature models.)

The present invention will now be described with reference to the accompanying drawing forming part of this specification and illustrating diagrammatically by way of example a typical form of embodiment of the invention. In the drawing:

FIGURE 1 is a perspective view showing a windshield wiper mounting constructed according to the teachings of this invention;

FIGURE 2 is a detail view showing the means for adjustably anchoring the torsion spring;

FIGURE 3 is a detail view showing the means for adjustably anchoring the traction spring, and FIGURE 4 is a cross-sectional view taken upon the line IV—IV of FIGURE 1.

Referring to the drawing, the windshield wiper mounting illustrated therein comprises two arms 1, and 2 pivotally interconnected; each arm is comprised of a strip curved in the transverse direction and having a constant or variable radius of curvature; the concave surface of each of these arms is directed toward the supporting arm 22 connected to the strap or yoke 3, that is forwardly; preferably, the arms 1, 2 are inclined transversely on the strap 3 so that their opposite upper and lower edges are positioned externally in relation to the vehicle with rearward edges 18 more remote from the windshield W than the forward edges 19, whereby the air stream flowing along the windshield surface as indicated by the arrow F, when the vehicle is in forward motion, will tend to press the wiper against this surface. Furthermore, these arms are provided with clamps or clips 17 adapted to receive the conventional wiper blade 20 by which the glass wiping action proper is accomplished. The wiper blade 20 is flexible in a plane perpendicular to a metal reinforcement strip 21 in the blade.

Secured on the contiguous ends of these arms 1, 2 by means of screws, rivets or the like is a pivotal composite mounting number 4 and 5 (FIG. 4) of substantially Z-shaped cross-section, which has inserted through its opposite wings a pivot pin 8 receiving the strap 3 on which the supporting arm 22 is mounted in the conventional manner.

The resilient pressure is exerted against the glass panel of the windshield W by means of either a torsion spring such as illustrated at 9, FIGS. 2 and 4, or a traction spring 10, FIGS. 1 and 3.

The torsion spring 9 consists of a steel wire having a plurality of turns wound on the pivot pin 8 and two straight portions 11, 12 of which the bent ends 13, 14 engage small holes 15 formed in the contiguous ends of arms 1, 2 as shown.

According to a specific feature of this invention, each arm 1, 2 is formed with a plurality of holes 15 spaced longitudinally and transversely whereby the position of the spring ends may be altered at will, thus varying at the same time the resistance to the torsion stress exerted by the spring of which two different positions are shown in FIG. 2 of the drawing.

This torsion spring mounting is particularly suitable for wiping windshields having a substantially constant curvature whereby the two arms of the mounting form with each other a practically constant angle during their travel on the surface to be wiped.

In the case of a variable-curvature windshield, for example of the type having rearward extensions on either side of the car, the windshield wiper, during the last portion of its outward travel, should preferably bear at least partially on these side extensions of the windshield so as to adhere during this portion of the travel on a surface area having a curvature considerably more accentuated and gradually increasing than that encountered in the central region of the windshield. In order to permit a proper deformation of the windshield wiper, a traction spring, for example of the coil type, is substituted for the torsion spring of which the force decreases as the curvature increases, this traction spring being disposed on the rear face of the mounting as shown in FIGS. 1 and 3.

This spring 10 is anchored by its ends in the orifices 15 without associating it with the pivot pin on the strap.

Under these conditions and if the spring is disposed asymmetrically in relation to the strap 3, that is, by anchoring on one side the spring end in a hole more spaced from the strap than the hole engaged by the other spring end (as shown in FIG. 3), it is possible to apply a stronger return force to the upper arm 1 of the mounting which follows the rearwardly extending portion. Thus, by properly adjusting the position of the spring anchoring points the arms may be caused to bear with an efficient pressure against a windshield portion having a variable curvature in the plane of operation of the windshield wiper.

Of course, various modifications and alterations may be made in the forms of embodiment shown and described herein, without departing from the spirit and scope of the invention as set forth in the appended claims.

What we claim and desire to secure by Letters Patent is:

1. Improved holder means for operably mounting a windshield wiper blade for use with curved windshields, said holder means comprising: two elongated wiper-blade holders, each said holder having forward and rearward longitudinal edges and being transversely curved to form oppositely disposed surfaces that are aerodynamically shaped respectively convex and concave, said holders being arranged in longitudinal extension of each other with similar aerodynamically shaped surfaces coinciding and with two ends respectively adjacent each other; mounting means on the respective adjacent ends of said holders, each said mounting means comprising wing portions having opposing coaxial holes with a common axis transverse to the longitudinal axis of said holder, one of said wing portions extending upwardly from the forward longitudinal edge and the other of said wing portions extending downwardly from the rearward longitudinal edge of the respective holder, said wing portions of said two holders being of complementary shape to interfit so that the coaxial holes of said portions respectively coincide; yoke means having a forked end with opposing sides that define coaxial holes, said sides being adapted to interfit with said wing portions of the mounting means and with the coaxial holes of the yoke means coinciding with the coaxial holes of the wing portions, said yoke means being adapted for mounting said holders for operation; pivot pin means mounted in said coinciding coaxial holes for pivotally fastening said yoke means and holders together, said holders being arranged to pivot around said transverse pivot pin means; attaching means longitudinally spaced along the convex surface of said holders for attaching a wiper blade thereto; resilient biasing means attached to said holders adjacent their pivoted ends for biasing said holders to pivot said convex surfaces toward each other, whereby when said improved holder means is operably mounted by said yoke means to engage a windshield with a wiper blade mounted on said convex surfaces, said wiper blade is conformed to the curved windshield by said pivotally joined and aerodynamically shaped holders being biased by said resilient biasing means and by the windstream pressure caused by movement of the vehicle being exerted aerodynamically along the longitudinal and transverse extent of said holders.

2. Improved holder means for operably mounting a windshield wiper blade for use with curved windshields, said holder means comprising; two elongated wiper-blade holders, each said holder having a forward longitudinal edge spaced upwardly from said wiper blade and a rearward longitudinal edge spaced further from said wiper blade and windshield and being curved continuously and progressively upwardly and rearwardly to form oppositely disposed surfaces that are aerodynamically shaped respectively convex and concave, said holders being arranged end to end in longitudinal extension of each other, and with said surfaces coinciding; yoke means having an end forked to interfit with said holders at their adjacent ends for mounting said holders for operation; connecting means pivotally joining said holders end to end and yoke means thereto and at an angle variable longitudinally therewith, said connecting means including a pivot pin extending transverse said holders and yoke means and inclined to said upper surfaces of said holders, whereby said holders are slanted relative to the pivot pin; clamp means longitudinally spaced along the convex lower surfaces of said holders for attaching a wiper blade thereto; resilient biasing means attached to said holders adjacent their pivoted ends for biasing said holders to pivot said lower convex surfaces toward each other, whereby when said improved holders with a wiper blade mounted on said lower surfaces is operably mounted by said yoke means to engage a windshield with said pivot pin parallel to said windshield and with said holders slanted therewith, said wiper blade is conformed to the curved windshield by said pivotally joined holders being biased by said biasing means and by the windstream pressure caused by movement of the vehicle being exerted along the entire longitudinal and transverse extent of the upper surface of said holders inclined relative to said pivot pin and said windshield.

3. In a windshield wiper-blade assembly, an improved holder means for operably mounting a flexible windshield wiper blade, said holder means comprising two elongated wiper-blade holders arranged in longitudinal extension of each other, connecting means pivotally joining adjacent portions of said holders, means associated with said connecting means for mounting said holder means on a windshield wiper arm, spring means biasing said holders for pivotal movement toward the windshield, and longitudinally spaced attaching means on each of said holders for attaching a wiper blade, said holders being of arcuate cross section and disposed with the convex faces of said holders toward the windshield and with forward edges of said holders closer to the windshield than rearward edges, the upper surfaces of said holders between said edges curving continuously progressively away from the windshield in an outward and rearward direction throughout substantially the lateral extent of said holders, whereby air flowing over said windshield when the vehicle is in forward motion flows over and under said holders to generate a useful aerodynamic force component acting on said holders in a direction toward the windshield and transmitted through said attaching means to said wiper blade to supplement the pressure applied by said wiper arm to counteract the tendency of said airflow to lift said wiper blade from the windshield.

4. In a vehicle windshield wiper-blade assembly, an improved holder means for operably mounting a flexible windshield wiper blade having a defined plane of flexure, said holder means comprising two elongated wiper-blade holders arranged in longitudinal extension of each other and having inner and outer faces, longitudinally spaced attaching means on said holders for attaching a wiper blade to said holders with said blade positioned inwardly of said holders and spaced from the inner faces of said holders, connecting means pivotally joining adjacent portions of said holders with a pivotal axis approximately perpendicular to the plane of flexure of said blade and means associated with said connecting means for mounting said holder means on a windshield wiper arm with the plane of flexure of said wiper blade approximately normal to the surface of the windshield, the inner and outer faces of said holders being oblique to the plane of flexure of the wiper blade and diverging continuously and progressively away from the windshield surface with forward edge portions of said holders closest to said surface and rearward edge portions of said holders farthest from said surface, the angle of inclination of said faces relative to said windshield surface progressively increasing from adjacent the forward edges toward the rearward edges of said holders throughout substantially the lateral extent of said holders, whereby air flowing over said windshield when the vehicle is in forward motion flows over the outer faces of said holders and between the wiper blade and the inner faces of said holder to produce an aerodynamic force on said holders with a useful component pressing said holders and wiper blade toward the windshield substantially throughout the length of said wiper blade.

5. In a vehicle windshield wiper assembly, the combination of an elongated wiper-blade holder having substantially greater width than thickness, said holder being of curved cross section throughout its width to provide concave and convex faces, longitudinally spaced attaching means on said holder for attaching on the convex face of said holder a flexible wiper blade having a defined plane of flexure, and connecting means for pivotally mounting said holder on a windshield wiper arm with the plane of flexure of said wiper blade approximately normal to the surface of the windshield and with the forward edge portion of said holder closest to said surface and the convex and concave faces of said holder curving continuously progressively away from said surface, whereby air flowing over said windshield when the vehicle is in forward motion flows over the curved face areas of said holder to produce an aerodynamic force on said holder with a useful component pressing said holder and wiper blade toward the windshield substantially throughout the length of said wiper blade and a lesser drag component acting on said holder in a direction parallel to the windshield surface in opposition to movement of said wiper assembly by said wiper arm.

6. In a windshield wiper-blade assembly, an elongated resilient member adapted to contact and wipe the surface of a windshield, a bridge assembly comprising an elongated bridge member superimposed upon and extending lengthwise of said wiper member and being substantially shorter in length than said wiping member, a second bridge member pivotally connected with said first-mentioned bridge member and operatively aligned therewith, means for mounting said bridge assembly on a wiper arm, spring means biasing said bridge members for pivotal movement of said bridge members toward the windshield, means connecting said bridge assembly with said wiping member to transmit thereto wiper-arm pressure, at least one of said bridge members having a forward edge spaced from said wiping member and a rearward edge disposed farther from said wiping member and the windshield than said forward edge and forming between said edges a surface curving continuously progressively away from the surface of the windshield throughout substantially the lateral extent of said one bridge member and terminating in a trailing edge portion disposed at an angle of materially less than ninety degrees to the windshield, whereby air flowing over said windshield when the vehicle is in forward motion flows over and under said bridge member to produce a useful aerodynamic force component acting on said bridge member in a direction toward the windshield and transmitted through said connecting means to said wiper member to supplement the pressure applied by said wiper arm to counteract the tendency of said air flow to lift said wiper member from the windshield.

7. In a windshield wiper-blade assembly adapted to be mounted on a windshield wiper arm, an elongated resilient wiper blade adapted to contact and wipe the surface of a vehicle windshield, a bridge assembly comprising an elongated bridge member extending lengthwise of said blade and being substantially shorter than said blade, a second elongated bridge member pivotally connected with said first-mentioned bridge member and operatively aligned therewith, means for mounting said bridge assembly on a wiper arm, spring means biasing said bridge members for pivotal movement of said bridge members toward the windshield and means for attaching said blade to said bridge assembly to transmit pressure of said wiper-arm to said wiper blade to press said wiper blade against the windshield, at least one of said bridge members having a forward edge, a rearward edge disposed farther outwardly from the windshield surface than said forward edge and an aerodynamic surface extending from said forward edge to said rearward edge and diverging continuously away from the windshield throughout substantially the lateral extent of said bridge member, the forward edge portion of said surface being approximately parallel to the windshield and a rear edge portion inclined at an angle of materially less than ninety degrees to the windshield, whereby air flowing over said windshield when the vehicle is in forward motion flows over and under said one bridge member in a direction towards the windshield and transmitted through said attaching means to said wiper blade to supplement the pressure applied by said wiper arm to counteract the tendency of said airflow to lift said wiper blade from the windshield, the pivotal axis of said pivotal connection between said bridge members being disposed outwardly of said forward edge and inwardly of said rearward edge with reference to the windshield surface.

8. In a windshield wiper blade assembly, an elongated resilient blade member adapted to contact and wipe the surface of a windshield, a bridge assembly comprising a plurality of interconnected bridge members, means for mounting said bridge assembly on a wiper arm, and means connecting said bridge assembly with said blade member to transmit wiper-arm pressure thereto, at least one of said bridge members comprising a straight elongated member of concave-convex cross section having a leading edge spaced from said blade member, a rearward edge spaced farther from said blade member than said leading edge and a surface constituting, between said edges, substantially an elongated section of a cylinder curving obliquely away from the surface of the windshield, said surface having a forward edge portion approximately parallel to the windshield and a rear edge portion disposed at an angle of materially less than ninety degrees to the windshield, said member of concave-convex cross section constituting an effective air foil on which an air stream flowing approximately parallel to the windshield surface acts to exert a force on said concave-convex member toward the windshield, said force being transmitted through said connecting means to said blade member.

9. In a vehicle windshield wiper blade assembly, an elongated resilient wiper member adapted to contact and wipe the surface of a windshield, an articulated bridge assembly comprising a plurality of elongated bridge members, means pivotally interconnecting said bridge members, means for mounting said bridge assembly on a wiper arm and means connecting said bridge assembly with said wiper member to transmit wiper-arm pressure to said blade member, at least one of said bridge members being spaced above said wiper member and having substantially throughout its length a cross-sectional shape comprising a leading edge portion spaced upwardly away from said wiper member and directed forwardly approximately parallel to the windshield, a trailing edge portion disposed farther from said wiper member and from the windshield than said leading edge portion and directed rearwardly and upwardly at an angle of materially less than ninety degrees to the windshield and upper and lower surfaces extending from said leading edge rearwardly to said trailing edge and merging smoothly into said edge portions, said surfaces diverging continuously and progressively away from said windshield throughout substantially the lateral extent of said one bridge member, whereby air flowing over said windshield when the vehicle is in forward motion flows over and under said one bridge member to generate a maximized useful aerodynamic force component acting on said one bridge member in a direction towards the windshield and transmitted through said connecting means to said wiper member to supplement the pressure applied by said wiper arm to counteract the tendency of said airflow to lift said wiper member from the windshield, and a lesser aerodynamic drag component acting parallel to the windshield in opposition to movement of said blade assembly by said wiper arm in a direction against said airflow.

References Cited by the Examiner
UNITED STATES PATENTS

| | | | |
|---|---|---|---|
| 2,794,203 | 6/1957 | Oishei | 15—250.36 |
| 2,814,820 | 12/1957 | Elliott et al. | 15—250.36 |
| 2,905,961 | 9/1959 | Oishei et al. | 15—250.42 |
| 3,037,233 | 6/1962 | Peras et al. | 15—250.42 |

CHARLES A. WILLMUTH, *Primary Examiner.*